United States Patent
Steele et al.

(10) Patent No.: US 10,221,834 B2
(45) Date of Patent: Mar. 5, 2019

(54) SAFETY SYSTEM FOR A WIND TURBINE (71) Applicant: VESTAS WIND SYSTEMS A/S, Aarhus N (DK)

(72) Inventors: David Steele, Skanderborg (DK); Jens Steen Krogh, Hjortshøj (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 310 days.

(21) Appl. No.: 14/916,781

(22) PCT Filed: Sep. 3, 2014

(86) PCT No.: PCT/DK2014/050270
§ 371 (c)(1),
(2) Date: Mar. 4, 2016

(87) PCT Pub. No.: WO2015/032410
PCT Pub. Date: Mar. 12, 2015

(65) Prior Publication Data
US 2016/0201648 A1 Jul. 14, 2016

(30) Foreign Application Priority Data
Sep. 5, 2013 (DK) .................................. 2013 70495

(51) Int. Cl.
F03D 7/04 (2006.01)
F03D 17/00 (2016.01)

(52) U.S. Cl.
CPC ............ F03D 7/047 (2013.01); F03D 7/042 (2013.01); F05B 2270/332 (2013.01); Y02E 10/723 (2013.01)

(58) Field of Classification Search
CPC ...... F03D 7/047; F03D 7/042; F05B 2270/33; F05B 2270/332; Y02E 10/72; Y02E 10/723; Y02E 10/74
(Continued)

(56) References Cited

U.S. PATENT DOCUMENTS 7,253,577 B2 * 8/2007 Campbell ................ G05B 9/02
  318/563
8,043,048 B2 * 10/2011 Daniels ................... F03D 17/00
  415/118
(Continued)

FOREIGN PATENT DOCUMENTS

CN 102235941 A 11/2011
CN 102288413 A 12/2011
(Continued)

OTHER PUBLICATIONS

Pedersen, et al.: "Safe Operation and Emergency Shutdown of Wind Turbines", May 31, 2012.
(Continued)

Primary Examiner — Michael J Brown
(74) Attorney, Agent, or Firm — Patterson + Sheridan, LLP (57) ABSTRACT To safely operate a wind turbine, a control system may determine a current state of the wind turbine and identify whether the state is within an operational envelope. Based on measured sensor data, the control system may calculate the current state of the turbine in a multi-dimensional space where each axis of the multi-dimensional space correlates to one of the measured parameters. The boundary of the operational envelope may define a region of the multi-dimensional space where the wind turbine is behaving in a safe manner. A safety system may determine if the state determined by the control system is accurate. If so, the safety system determines whether the current state is within the operational envelope. If the state is outside the envelope, the wind turbine may switch to a safe state during which the turbine may be decoupled from the utility grid or the rotor is stopped.

20 Claims, 5 Drawing Sheets (58) Field of Classification Search
USPC .......................................................... 700/287
See application file for complete search history.

(56) References Cited

U.S. PATENT DOCUMENTS

| | | | |
|---|---|---|---|
| 2011/0049883 A1 | 3/2011 | Hatch et al. | |
| 2012/0027566 A1 | 2/2012 | Boerlage et al. | |
| 2012/0070285 A1* | 3/2012 | Cousineau | F03D 7/0224 416/31 |
| 2012/0134830 A1* | 5/2012 | Tozzi | F03D 7/0212 416/169 R |

FOREIGN PATENT DOCUMENTS

| | | |
|---|---|---|
| DK | 201070274 A | 4/2011 |
| EP | 2551513 A2 | 1/2013 |
| WO | 2010/060772 A2 | 6/2010 |
| WO | 2010/139613 A2 | 12/2010 |
| WO | 2011/076818 A2 | 6/2011 |
| WO | 2011/076875 A2 | 6/2011 |
| WO | 2012/025121 A2 | 3/2012 |
| WO | 2012/113403 A1 | 8/2012 |
| WO | 2013/075720 A2 | 5/2013 |

OTHER PUBLICATIONS

International Search Report for PCT/DK2014/050270, dated Nov. 6, 2014.
Danish Search Report for PA 2013 70495, dated Mar. 31, 2014.

* cited by examiner

SAFETY SYSTEM FOR A WIND TURBINE

BACKGROUND

Field of the Invention

Embodiments of the invention generally relate to operating a wind turbine safely and, more particularly, to using a safety system to determine whether a wind turbine is operating within an operational envelope.

Description of the Related Art

To prevent catastrophic failure that would prevent the turbine from being able to operate (e.g., the blade detaching and damaging other portions of the wind turbine), a failure detection system may be used. If the detection system identifies a structural failure, the operation mode of the turbine may be changed to prevent the catastrophic failure. For example, the turbine may be removed from the utility grid until a cracked blade is fixed or replaced.

In one example, the wind turbine may obtain data from a plurality of different sensors associated with the turbine. This data may then be used to predict a failure of one or more components in the turbine. If the data indicates that the wind turbine is behaving outside of predefined parameters, the wind turbine may change its operation mode to prevent structural and catastrophic failures. However, detecting a problem before structural failure occurs using data from a plurality of sensors may be a difficult and time consuming process.

SUMMARY

One embodiment of the present disclosure includes a system for controlling a wind turbine. The system includes a computing system for controlling one or more components in the wind turbine. The computing system is configured to obtain sensor data comprising measured values of a plurality of parameters associated with the wind turbine and determine, based on the obtained sensor data, a state of the wind turbine within a multi-dimensional space where each axis in the multi-dimensional space corresponds to a respective one of the plurality of parameters. The system further includes a safety system for monitoring and controlling the wind turbine to prevent harm to components of personnel in, or proximate to, the wind turbine. The safety system is configured to determine whether the state determined by the computing system is accurate, and if so, determine whether the state is within a predefined operational envelope where the operational envelope encapsulates a region of the multi-dimensional space.

Another embodiment of the present disclosure includes a method for controlling a wind turbine. The method includes obtaining sensor data comprising measured values of a plurality of parameters associated with the wind turbine and determining, based on the obtained sensor data, a state of the wind turbine within a multi-dimensional space using a computing system configured to control one or more components in the wind turbine. Each axis in the multi-dimensional space corresponds to a respective one of the plurality of parameters. The method includes determining whether the state determined by the computing system is accurate using a safety system configured to monitor and control the wind turbine to prevent harm to components of personnel in, or proximate to, the wind turbine. Upon determining the state is accurate, the method includes determining whether the state is within a predefined operational envelope where the operational envelope encapsulates a region of the multi-dimensional space.

Another embodiment in the present disclosure is a wind turbine that includes a computing system for controlling one or more components in the wind turbine. The computing system is configured to obtain sensor data comprising measured values of a plurality of parameters associated with the wind turbine and determine, based on the obtained sensor data, a state of the wind turbine within a multi-dimensional space where each axis in the multi-dimensional space corresponds to a respective one of the plurality of parameters. The wind turbine includes a safety system for monitoring and controlling the wind turbine to prevent harm to components of personnel in, or proximate to, the wind turbine. The safety system is configured to determine whether the state determined by the computing system is accurate and, if so, determine whether the state is within a predefined operational envelope where the operational envelope encapsulates a region of the multi-dimensional space.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

To prevent failures in a wind turbine, a control system may determine a current state of the wind turbine and identify whether the state is within an operational envelope. Specifically, the turbine may include sensors that measure values of various parameters in the turbine such as nacelle oscillations, tower vibration, blade loads, temperature, current, voltage, and the like. Based on this sensor data, the current state of the turbine can be calculated in a multi-dimensional space where each axis of the multi-dimensional space correlates to one of the measured parameters. The boundary of the operational envelope may define a region in the multi-dimensional space where the wind turbine is behaving in a safe manner. If the wind turbine determines that the current state is within the operational envelope, the turbine may continue to operate normally. If, however, the state is outside the envelope, the wind turbine may switch to a safe state during which the turbine may be decoupled from the utility grid or the rotor is stopped.

In one embodiment, the wind turbine is associated with a control system that controls the different components in the turbine—e.g., blade pitch, power converter, yaw motors, etc. The wind turbine may also have a separate safety system that ensures that the wind turbine is operating safely. For example, the safety system may be tasked with determining if the wind turbine is operating within the operational envelope. However, calculating the current state of the wind turbine may require intensive calculations. To identify the state of the wind turbine in an acceptable time, the safety system may require, for example, multiple processors that would otherwise not be needed. However, these computing components may need to be certified before they can be used in a safety system which means that computing components in the safety system may be more expensive than computing components used in the control system.

To reduce the cost of the safety system, the control system may be tasked with determining the current state of the wind turbine. Because the computing components used in the control system (e.g. generic or off-the shelf processors) may be cheaper than their counterparts in the safety system, adding computing resources to the control system to identify the current state in a timely manner may be less expensive than adding computing resources to the safety system for identifying the current state in a timely manner. After determining the state, the safety system may verify or check the solution provided by the control system to ensure accuracy. Performing this verification may require a calculation that is less complex or intensive than the calculation used to initially determine the state. In this manner, the safety system ensures that the turbine is operating safely without the added cost of additional computing resources to identify the current state of the turbine.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
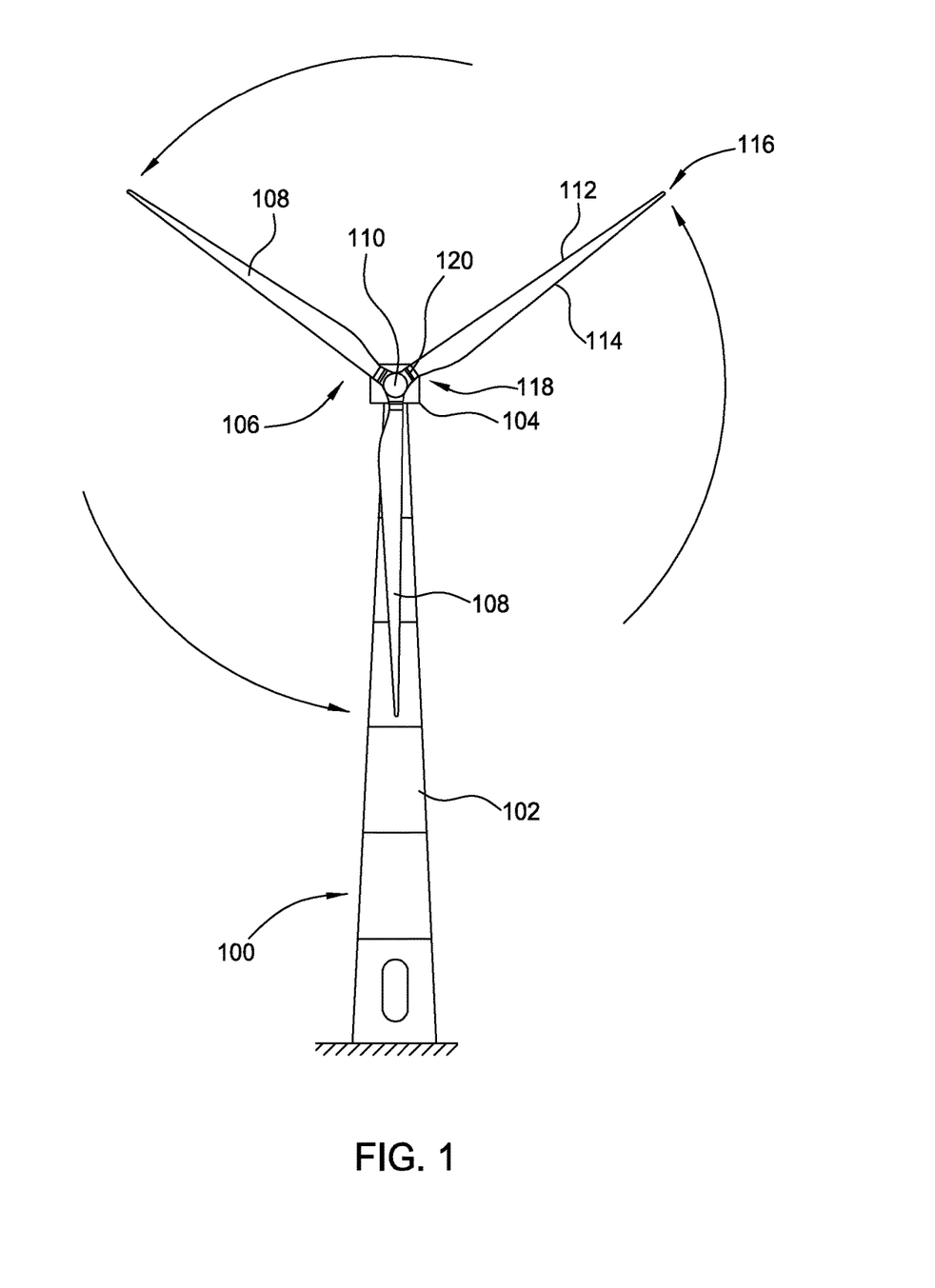
FIG. 1 illustrates a diagrammatic view of a wind turbine, according to one embodiment described herein.

FIG. 1 illustrates a diagrammatic view of a horizontal-axis wind turbine generator 100. The wind turbine generator 100 typically includes a tower 102 and a wind turbine nacelle 104 located at the top of the tower 102. A wind turbine rotor 106 may be connected with the nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108.

Figure 2:
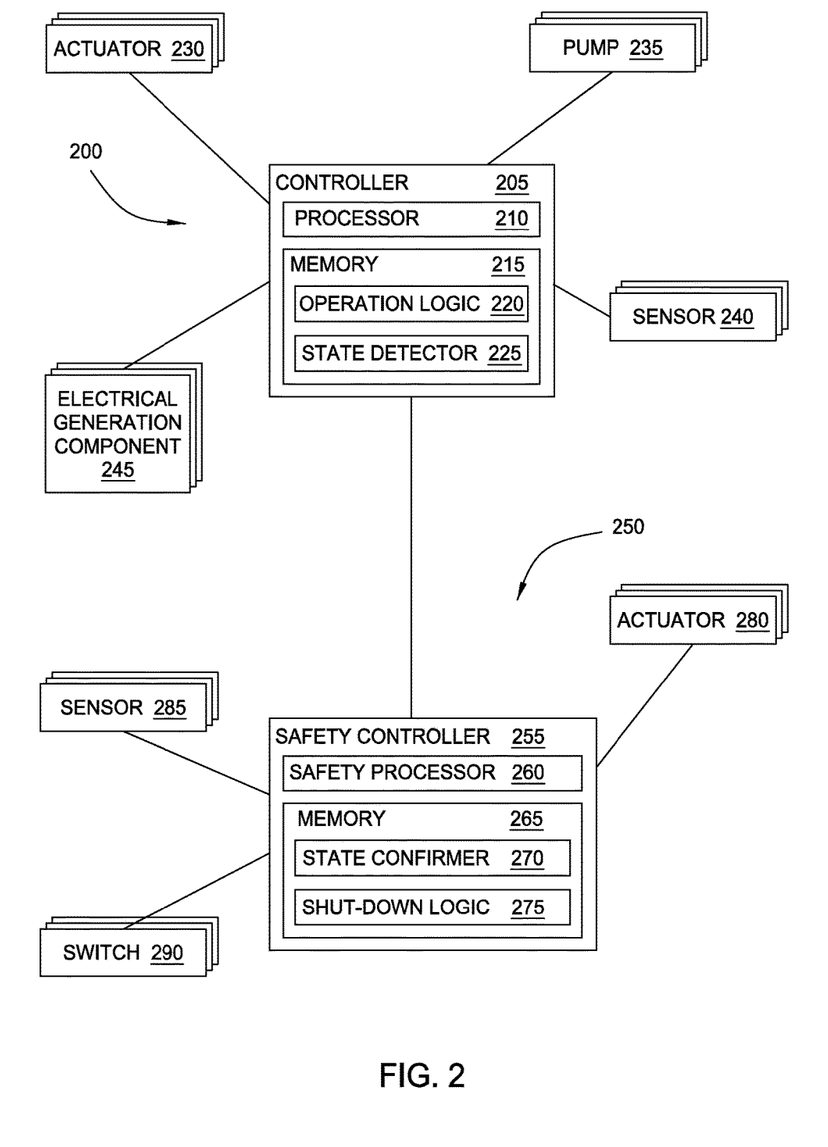
FIG. 2 illustrates a control system and a safety system associated with the wind turbine, according to one embodiment described herein.

FIG. 2 illustrates a control system 200 and a safety system 250 associated with the wind turbine, according to one embodiment described herein. The control system 200 includes a controller 205 (e.g., one or more computing devices) that includes a processor 210 and memory 215. The processor 210 may be a generic, off-the-shelf processor with one or more processing cores. Processor 210 may be a general-purpose processor (GPP) or a specially designed ASIC for controlling the wind turbine.

Memory 215 may include volatile or non-volatile memory such as DRAM, SRAM, Flash, hard disks and the like. Although not shown, memory 215 may extend to include external storage elements that are outside of the controller 205—e.g., a remote storage server. Memory 215 includes operation logic 220 and a state detector 225. The operation logic 220 may be an application that controls the functions of the wind turbine. For example, operation logic 220 may receive data from various sensors 240 associated with the components of the wind turbine, and, based on this measured data, derive control signals that control the components—e.g., actuators 230, pumps 235, and electrical generator components 245. For example, the sensors 240 may include a sensor that measures the load on the wind turbine's blades. Based on the current load, operation logic 220 may send a control signal to respective blade pitch actuators 230 that increase or decrease the load on the blades. In another example, a sensor 240 may detect that one of the electrical generation components 245 is overheating. Based on operation logic 220, controller 205 may transmit a control signal to a pump 235 that increases the flow of a cooling fluid to the overheating components as well as an instruction to the electrical generation component 245 (e.g., a circuit breaker) to stop electricity from flowing through the overheating component. FIG. 2 is intended to illustrate only one example of the different components that may be monitored and controlled by the control system 200. In other embodiments, the control system 200 may include fewer or more components than the ones shown.

In one embodiment, the safety system 250, which includes actuators 280, sensors 285, switches 290, and safety controller 255, is responsible for the safety of the turbine components as well as the human personnel near the turbine. To do so, the safety controller 255 may monitor various components of the wind turbine using sensors 285 and determine if the turbine is behaving properly. If the turbine behaves abnormally, the safety controller 255 may use the actuators 280 and switches 290 to shut down the wind turbine. To perform this function correctly, the safety system 250 may be associated with additional certification criteria and more rigorous testing standards than the logic and hardware in the control system 200. For example, if a change is made in the safety system 250, the change may first need to be certified by following special safety protocols where every branch of execution is checked to ensure the change does not cause the safety system 250 to fail. In one embodiment, using the safety system 250 as described herein to determine safe operation of the wind turbine may generate precise and safety certifiable wind turbine states, enables optimized wind turbine design in terms of structural design and material use, and enables optimized wind turbine operation and electricity generation under a wide variety of weather conditions.

The safety system 250 may also use different components than the control system 200. For example, safety controller 255 includes a safety processor 260 that may be certified for use in a safety system. Such processors 260 typically include a number of features to detect failures and to ensure that the response of the chip in the event of failure puts the system in some safe state. Specifically, the safety processor 260 may ensure that any conceivable failure does not result in an action that would cause the wind turbine to be unsafe. In one embodiment, processor 260 may include multiple processing elements that each double check the calculations made by the other processor. If the respective calculations do not match, the processor 260 may be designed to shut down the components controlled by the processor 260. That is, if the processor 260 experiences an error—e.g., is exposed to physical shock, deterioration, or heat such that the processor 260 malfunctions—the safety processor 260 still shuts down the wind turbine safely. In one embodiment, the processors 260 are dual cores running in lock step (i.e., executing the same exact code slightly shifted in time with the results being constantly compared) or single core with some sort of separate hardware checker to verify correct function. Because a large part of assuring safe operation is shifted to the safety processors 260, using safety processors 260 may make the task of safety analysis more manageable as these processors 260 reduce the complexity of the mechanisms which the software developer and safety manager need to analyze. In this manner, the safety system 250 may include components that are designed to detect and handle errors in the safety system 250 itself (i.e., internal faults), in addition to detecting and handling abnormal behavior of components monitored by the safety system 250 such as the control system 200.

The safety processors 260 may be designed to meet the appropriate International Organization for Standardization (ISO) or International Electrotechnical Commission (IEC) standards for safety, for example, ISO 13849, IEC 62061, IEC 61508, etc. for industrial application like wind turbines. Furthermore, the safety processors 260 may have received approval from certifying authorities that the processors 260 are suitable for safety applications and that their behavior is deterministic. For example, to receive certification, the safety processors 260 (and the safety system 250 as a whole) may have to have documentation that ensures that every possible execution and failure scenario which could affect safety is described in full detail and is accounted for.

In one embodiment, the safety system 250 may use an operational envelope to determine if the wind turbine is behaving abnormally. If the state of the turbine is outside of the operational envelope, the safety controller 255 may use the shut-down logic 275 to, e.g., disconnect the turbine from a utility grid, stop rotor rotation, and the like. However, as will be discussed in greater detail below, determining whether the current state of the turbine is within the operational envelope may require intensive calculations that require multiple safety processors 260 to complete the calculations within an acceptable time period. In one embodiment, the safety system 250 may ensure that the current state of the turbine is within the operational envelope at least once every second, but this interval may be less (e.g., every 10 milliseconds) or more (e.g., every thirty seconds). Because safety processors 260 may be much more expensive than an off-the-shelf processor or GPP (e.g., processor 210), adding more safety processors 260 to increase the speed by which the safety system 350 calculates the current state may be cost prohibitive.

Instead, the processors 210 in the control system 200 may be used to calculate the current state of the wind turbine. Specifically, memory 215 includes state detector 225 which may be an application for determining, based on data retrieved from sensors 240, whether the current state of the wind turbine is within a predefined operational envelope. To increase the speed at which the control system 200 calculates the current state of the wind turbine, additional processors 210 (i.e., processors not certified for use in a safety system) may be added to system 200 which may incur much smaller cost than adding safety processors 260. Processors 210 may then be used to execute the state detector 225 application to calculate the current state.

Although the embodiments herein disclose using the controller 205, or more broadly, the control system 200 for determining the current state, this is just one example of a computing device or system capable of calculating the current state. In one embodiment, a special computing system may be added to the wind turbine or a wind farm for performing this calculation. Alternatively, the wind turbine may transmit the sensor data to an external computing system (e.g., a data center) over a LAN or WAN which performs the calculations to solve for the current state. Regardless which computing device or system is used, the safety controller 255 may then use state confirmer 270 to ensure that the current state is accurate (e.g., satisfies a predetermine threshold of accuracy) and is within the operational envelope. As used herein, the operational envelope is a region (e.g. a volume or area) with a defined boundary in a multi-dimensional space where each dimension or axis is associated with a measured value of a parameter associated with the wind turbine.

Figure 3:
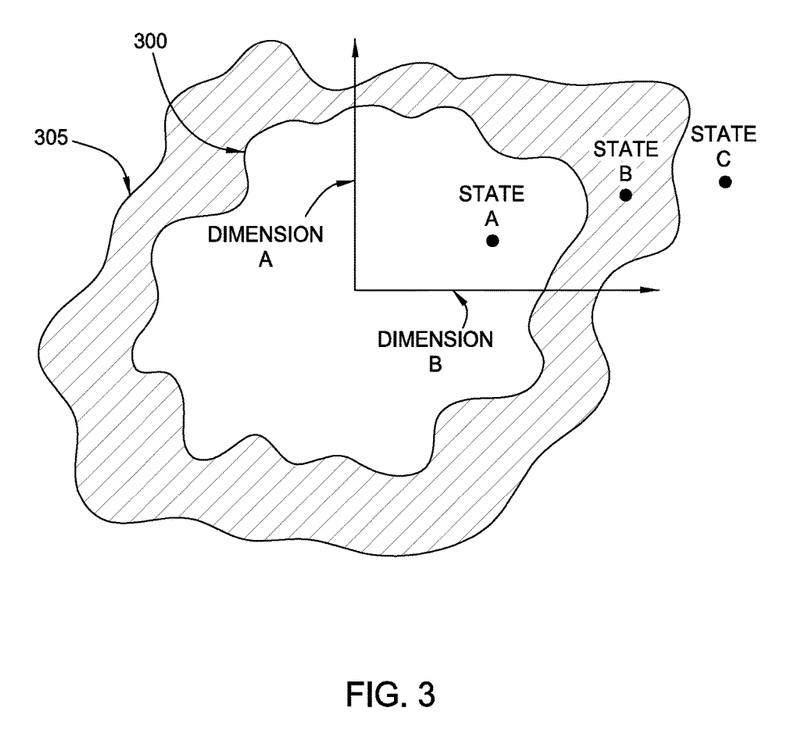
FIG. 3 illustrates operational envelopes associated with the wind turbine, according to one embodiment described herein.

FIG. 3 illustrates operational envelopes associated with the wind turbine, according to one embodiment described herein. Specifically, FIG. 3 illustrates a primary operational envelope 300 and a fringe or buffer operational envelope 305 that surrounds the primary envelope 300. For simplicity, FIG. 3 illustrates a multi-dimensional space with only two defined dimensions or axes: Dimension A and Dimension B. These dimensions may correspond to a measured parameter of the wind turbine. For example, each dimension may correspond to one of the values measured by the sensors 240 of the control system 200 in FIG. 2. The dimensions may be rotor speed, acceleration of the nacelle, oscillation of the tower in a direction of the wind, oscillation of the tower in a direction perpendicular to the wind, shock to a component in the wind turbine, wind speed, wind direction, and the like. Although FIG. 3 illustrates a simple example where two dimensions are used, the embodiments discussed herein may be used with any number of dimensions (e.g., 3, 8, 20, etc.) where each dimension is associated with a different measured parameter of the wind turbine.

The boundaries or shape of the operational envelopes 300 and 305 may be predefined. For example, the wind turbine may be tested (either by actual use or simulation) to define the boundaries of the envelopes 300 and 305. In one embodiment, the criteria used for defining the boundary of the primary envelope 300 is whether the wind turbine can be switched from a normal mode of operation to a safe state or mode in which the wind turbine is safely shut down. For example, the boundaries of the envelope 300 may be based on whether switching to the safe state is guaranteed to safely shut down the turbine—e.g., the rotor can be stopped/idled or the power generation units can be disconnected from the grid without causing harm to either the turbine components or human personnel in or around the turbine. This boundary may be defined either by actual data (e.g., stress testing a turbine or executing a computer simulation) or by estimating the boundary based on, for example, manufacture's specifications of the different components or based on common operating parameters. For example, if Dimension A is the oscillation of the tower in the direction of the wind while Dimension B is the oscillation of the tower in a direction perpendicular to the wind, the primary envelope 300 defines an area where the wind turbine is able to safely to shut down the rotor to prevent these oscillations for damaging the wind turbine—i.e., the envelope 300 defines a region where the oscillations are acceptable or considered normal. In contrast, buffer envelope 305 may define an area or region surrounding primary envelope 300 where the wind turbine is considered to be behaving abnormally. Thus, if the measured oscillations indicate a state of a wind turbine located within envelope 305, the wind turbine may be switched into the safety mode and shut down.

Although shown as two separate envelopes 300, 305, in one embodiment, the envelopes 300, 305 may be combined into a single envelope. In another embodiment, only the primary envelope 300 is used. In this case, if the current state is outside the boundary of envelope 300, the wind turbine is switched to the safe state and may be shut down.

In one embodiment, the shape or boundaries of the envelopes 300, 305 may be based on financial parameters such as cost, expenditures, income/profit, maintenance fee, and the like. Stated differently, in addition to considering whether the wind turbine can be safely shut down, the boundaries may consider the business aspect of managing and operating a turbine. For example, even if the turbine may be operated safely at a specific point in the dimensional area shown in FIG. 3, the boundary of the primary envelope 300 may be set to exclude this point because of the wear on the component and the resulting maintenance cost. Thus, the turbine may be shut-down in conditions where the turbine could be operated safely but it does not make financial sense to do so.

FIG. 3 illustrates three different states or points in the multi-dimensional space—State A, B, and C. Based on current measured values of the parameters that define Dimensions A and B, the control or safety system in the wind turbine may calculate a current state—i.e., a point in the region defined by Dimensions A and B. Because State A is within the primary operational envelope 300, the wind turbine is deemed to be behaving normally and is allowed to continue to operate. If the measured values, however, indicate that the wind turbine is in State B, the wind turbine may switch to a safe state and begin shutting down the turbine. State C may represent a failure state where, if the measured values indicate that the turbine is in this state, a structural failure is likely to occur. Accordingly, the primary and buffer envelopes 300, 305 may be used to ensure that the wind turbine never enters State C—i.e., the region surrounding buffer envelope 305. That is, the control or safety system may use the boundary between the primary and buffer envelopes 305 to ensure that as soon as the wind turbine's state crosses this boundary, the turbine is shut down to prevent structural or catastrophic the failure.

A computing device may be tasked with using the measured parameter values to calculate the current state of the wind turbine. For example, the computing device may use a predefined algorithm to correlate the measured values to identify a particular point in the multi-dimensional space. In the two-dimensional space shown in FIG. 3, this calculation may be straightforward. However, in many examples, the multi-dimensional space may include ten or twenty dimensions where dimension each corresponds to a different measured parameter associated with the wind turbine. Because the current state may be derived by correlating each measured parameter to all the other measured parameters, adding a new dimension may scale the complexity exponentially. Thus, the time required for the computing device to identify a current state of the turbine when three dimensions are used may be at least twice as much as the time required when only two dimensions are used.

Because deriving the current state may require more and more time as more dimensions or parameters are considered, the computing device may use various algorithms, such as a search algorithm, to identify the state. For example, a search algorithm may divide the multi-dimensional space into a plurality of sectors and determine if the state is within the sector. If not, the algorithm moves to a different sector. If, however, the state is in the sector, the algorithm further divides the sector into sub-sectors and evaluates each sub-sector to determine if the solution is within those sectors, and so forth. The computing device may shrink the sectors into a point that represents the state of the wind turbine. One non-limiting example of a search algorithm for identifying a solution in a multi-dimensional space is the Gilbert-Johnson-Keerthi distance algorithm. However, the embodiments herein are not limited to any particular type of algorithm for identifying a current state.

Returning to FIG. 2, control system 200 may use the measured values retrieved from the sensors 240 to determine the current state of the wind turbines using the state detector 225 in controller 205. Specifically, the state detector 225 may use, for example, a search algorithm to identify the current state of the wind turbine—i.e., a point within the multi-dimensional space shown in FIG. 3. Although not shown, the control system 200 may have any number of processors 210 that execute the state detector application 225 in parallel in order to reduce the time required to determine the current state of the turbine.

As will be discussed in more detail below, the safety controller 255 may be used to determine whether the control system 200 accurately determined the correct state of the wind turbine. In other words, the safety controller 255 may be used to verify that the solution identified by the control system 200 is correct. This may be a relatively easy computation when compared to the intensive computation the control system 200 performed in order to identify the solution—i.e., the current state of the turbine. Accordingly, the number of safety processors 260 needed to verify the solution identified by the control system 200 in a timely manner may be much less than the number of processors 260 needed if the safety system 250 was tasked with identifying the state of the wind turbine in a timely manner. As such, the combined cost of the control and safety systems 200 and 250 may be reduced relative to adding computing resources to the safety system 250 for determining the current state.

The controllers 205 and 255 may be located within the wind turbine—e.g., within the nacelle 104 or tower 102 of turbine 100 in FIG. 100—or may be part of an external monitoring system—e.g., a SCADA. That is, the controllers 205, 255 may use data connections (e.g., a local access network) to receive data from sensors 240 and 290 and transmit control signals to actuators 230, 280, switches 290, pumps 235, and the electrical generation components 245. Moreover, the control and safety systems 200, 250 may be associated with only one turbine or a plurality of turbines. For example, the control system 200 may calculate a current state of a plurality of different turbines while the safety system 250 is responsible for ensuring the current states of the turbines are within the operational envelope.

Figure 4:
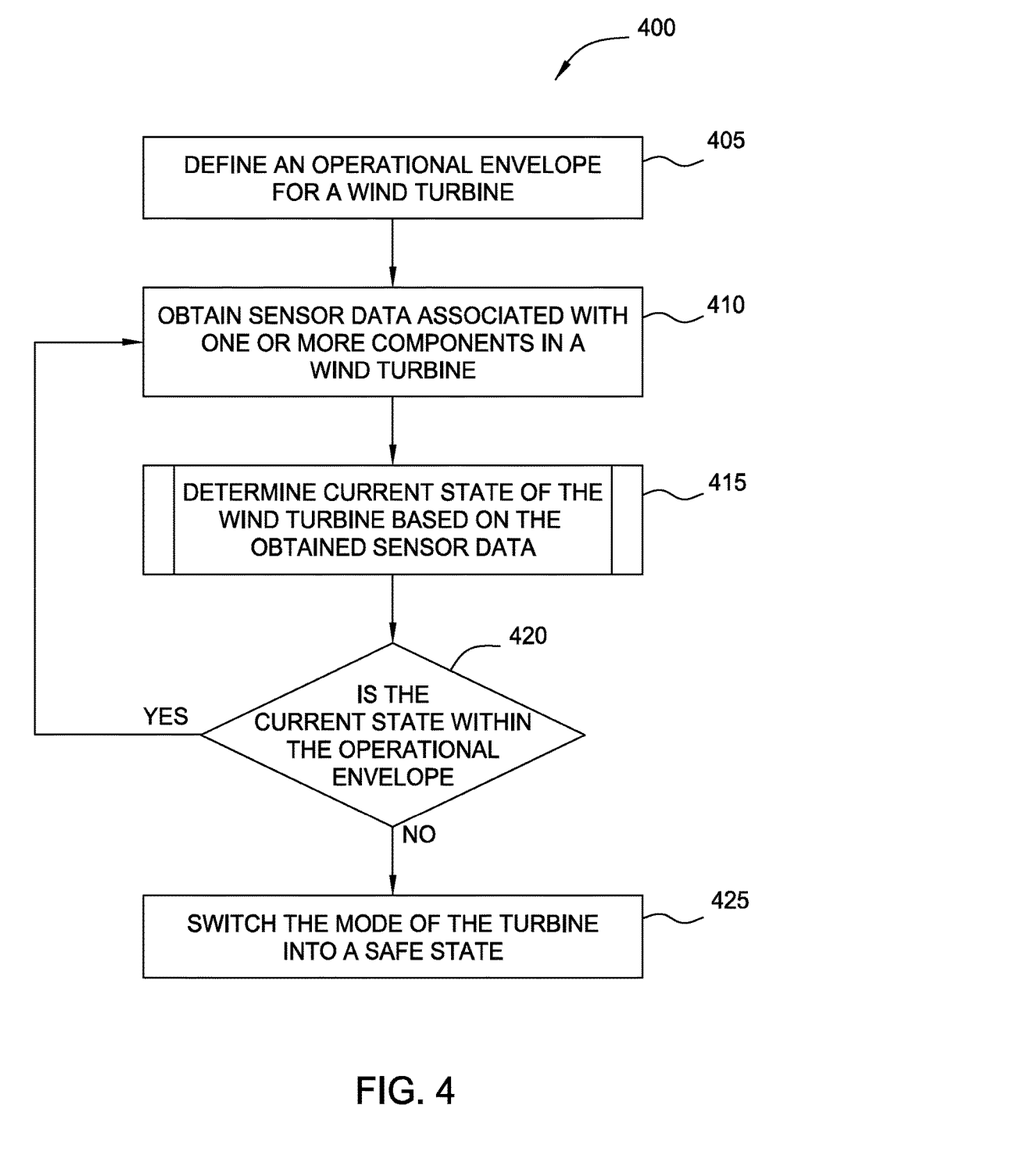
FIG. 4 illustrates a method for determining if a current state of the wind turbine is within the operational envelope, according to one embodiment described herein.

FIG. 4 illustrates a method 400 for determining if a current state of the wind turbine is within the operational envelope, according to one embodiment described herein. Method 400 begins at block 405 where a wind turbine operator defines an operational envelope for a wind turbine or a plurality of wind turbines. As discussed above, the boundaries of the operational envelope define a volume where, if the current state of the turbine is within the envelope, the turbine is deemed to be behaving normally. The shape or boundary of the operational envelope may be based on relationships between the various parameters that form the different dimensions in the multi-dimensional space. The parameters may be measured values from the turbine (e.g., vibration, shock, electrical outputs, load, etc.) or financial considerations such as maintenance costs, operation costs, price of electricity, and the like. For example, the operational envelope may be designed to exclude regions of the multi-dimensional space even if the turbine may be operated safely in those regions if doing so would be unprofitable. In one embodiment, the operational envelope may be predefined such that the envelope is not changed after the turbine is operational. Alternatively, the operational envelope may be defined or updated based on measurements obtained from various parameters in the wind turbine while the turbine is operating.

At block 410, the wind turbine obtains sensor data associated with one or more components in the wind turbines. Specifically, the sensor data may be associated with the parameters that define the dimensions of the multi-dimensional space. For example, the multi-dimensional space may be defined by four axes where each axis corresponds to the vibration measured by a specific sensor in the wind turbine. The sensor data may originate from sensors in the control system, the safety system or both and may be associated with a component on the wind turbine such as a generator, power converter, rotor blade, and the like. However, the wind turbine may also obtain sensor data associated with parameters external to the wind turbine such as a wind speed measured at various locations in a wind farm or from a component shared by the turbines in the wind farm such as utility grid transformer. In one embodiment, in addition to the sensor data, the wind turbine may consider the current price of electricity (or some other financial parameter used as a dimension of the multi-dimensional space) when calculating the current state of the turbine.

At block 415, the wind turbine determines the current state of the wind turbine based on the obtained sensor data from block 410. In one embodiment, the control system, and not the safety system, is used to determine the current state. Thus, cheaper off-the-shelf processors such as a GPP may be used to perform the calculations necessary to identify (or solve for) the current state. One drawback, however, for performing the calculations using the control system is that the processors (as well as other hardware elements) are not certified for use in a safety system. For example, if one of the processors used to determine the current state malfunctions, the processors lack the redundant checks that safety processors have to identify and catch the error. Thus, as will be discussed in more detail below, the safety system may be used to verify the solution (i.e., the current state) provided by the control system.

At block 420, the wind turbine determines if the current state is within the operational envelope. In one embodiment, the control system may transmit the current state to the safety system which first checks to see if the state is accurate and then determines if the state is within the envelope. If the state is within the envelope, then method 400 proceeds to block 410 where new sensor data is obtained and the control system recalculates the location of the current state in the multi-dimensional space. That is, method 400 continues to calculate the current state so long as the state remains within the operational envelope.

If the current state is outside the envelope—e.g., the state is in the buffer envelope shown in FIG. 3—the safety system may switch the turbine into a safe state as shown in block 425. In one embodiment, the safe state may define a process for shutting down the turbine. Because the boundaries of the operational envelope may define a region where the turbine can be shut down safely, once the turbine leaves these boundaries, the safety system switches to the safe state. The safe state may slow or stop the rotational motion of the rotor, electrical disconnect the turbine from the electrical grid of the wind farm, or both. For example, the safe state may pitch the blades to a feathered position (e.g., pitch out the blades) to slow down the rotor hub to idle. The generator may be disconnected before feathering, at the same time as feathering is commenced or later in the feathering sequence. Once the rotor is idling, the safety system may use a brake to stop the rotor.

Figure 5:
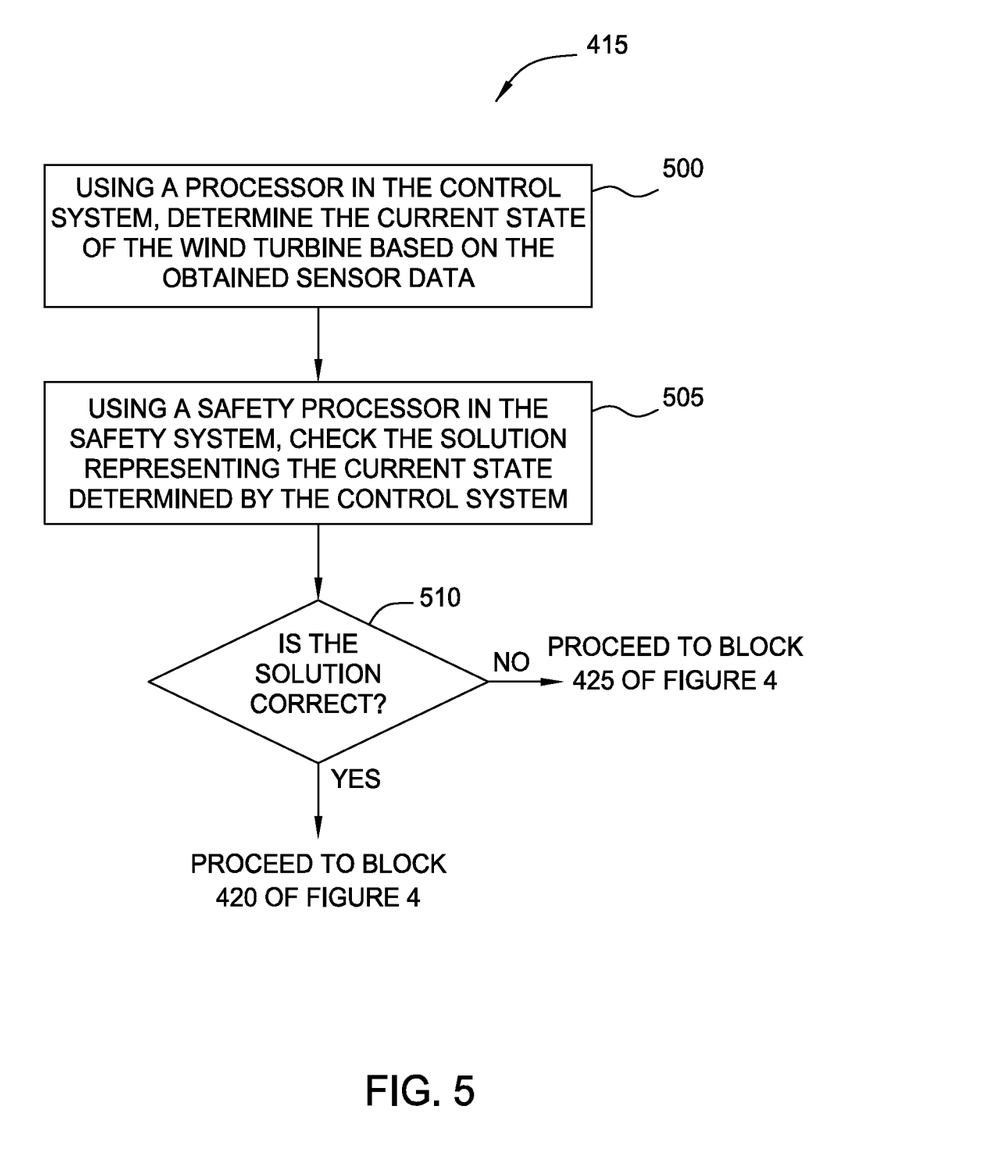
FIG. 5 is a method for using the safety system to check whether control system accurately determined the current state of the wind turbine, according to embodiments described herein.

FIG. 5 is a method for using the safety system to verify whether control system accurately determined the current state of the wind turbine, according to embodiments described herein. Specifically, FIG. 5 shows a more detailed explanation of block 415 of method 400. At block 500, a processor in the control system may be used by the state detector to determine the turbine's current state. In embodiment, the state detector may use an iterative algorithm that performs a plurality of sequential steps or calculations for identifying the current state based on the measured sensor data. For example, the state detector may use a geometric search algorithm as described above to identify the location of the current state in the multi-dimensional space. With this type of algorithm, the state detector divides the space into different regions and determines if the location is in a particular region. If so, the region is further divided into sub-regions which are then evaluated, and so forth.

However, because the processors in the control system may not be certified for use in a safety system, the processors may provide an erroneous result which affects the solution calculated by the state detector. Unlike safety processors which may be designed with redundant processing cores to detect and shut down the wind turbine if one of the cores malfunctions, the processors in the control system may not be designed to detect internal errors. Accordingly, the computations performed by the processors may provide an erroneous solution without any indication that the current state is inaccurate. Thus, the control system may indicate that the current state of the wind turbine is within the envelope—i.e., is behaving normally—when in fact the state may be outside the envelope. A wind turbine that relies solely on the control system to determine if the wind turbine is operating within the envelope cannot guarantee that the wind turbine can always be switched to the safe state and shut down.

To account for the limitations of the control system, at block 505, the safety system may verify the solution provided by the control system. That is, the state confirmer 270 of the safety controller 255 in FIG. 2 may perform a calculation to ensure that the current state provided by the control system is indeed the correct solution based on the current sensor data. Verifying that a solution or state is accurate may be a much less compute intensive task than identifying the solution. For example, if an iterative search algorithm is used, the state confirmer only needs to verify that the last iteration correctly identifies the current state. Accordingly, the safety system may have fewer safety processors compared to the number of processors in the control system and still perform the verification in a timely manner.

Relying on the safety system to verify the calculation may also guarantee that that the wind turbine is able to be shut down if the control system malfunctions. For example, if a processor (or other component) in the control system malfunctions and calculates an erroneous state, the state confirmer in the safety system catches the erroneous state. Because the state is erroneous, the state confirmer cannot guarantee the current state of the turbine is within the envelope and the safety controller may switch the wind turbine to the safe state and shut-down the turbine as shown by block 510—i.e., proceed to block 425 of FIG. 4. Alternatively, instead of shutting down the turbine, the safety system may begin to calculate the current state of the wind turbine. This may take more time than if the control system performed the calculation (assuming the control system has more computing power) but still may be acceptable for some situations. For example, the safety system may output a solution every two minutes instead of every five seconds. To account for this increased delay, the boundaries of the operational envelope may be shrunk to reduce the chance the state of the wind turbine will enter a region of the multi-dimensional space where the turbine cannot be shut down before a failure occurs.

In one embodiment, the control system may correctly calculate the current state but a safety processor may malfunction causing the state confirmer to produce erroneous results. However, because the safety processor may include internal checking mechanism, the safety processor will identify the malfunction and proceed to switch the turbine into the safe state. Accordingly, regardless of a malfunction in a component in the control system or a component in the safety system, the safety controller is configured to detect this malfunction and switch the mode of operation to the safe state. At block 510, if the state confirmer determines that the solution or state derived by the control system is accurate, the method proceeds to block 420 of FIG. 4 to determine whether the current state is within the operational envelope.

Although the embodiments above permit the safety system to use fewer safety processors and still accurately determine if the turbine's current state is within the operational envelope, the present disclosure may also help to reduce the number of other components in the safety system such as memory, network cards, network devices, and the like that may otherwise be added if the safety system was tasked with identifying the current state of the wind turbine.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system for controlling a wind turbine, the system comprising:
   a computing system communicatively coupled to the wind turbine, the computing system comprising at least a first processor that is configured to:
      obtain sensor data comprising measured values of a plurality of parameters associated with the wind turbine,
      determine, based on the obtained sensor data, a state of the wind turbine within a multi-dimensional space, where each axis in the multi-dimensional space corresponds to a respective one of the plurality of parameters, and
      communicate, based at least on the sensor data, a control signal to at least a first component of the wind turbine; and
   a safety system comprising at least a second processor that is configured to:
      verify that the state identified by the computing system satisfies a threshold of accuracy,
      upon verifying the state, determine whether the state is within a predefined operational envelope to determine safe operation of the wind turbine, the operational envelope encapsulating a region of the multi-dimensional space, and
      when the state is outside the predefined operational envelope, communicate a control signal to at least a second component of the wind turbine.

2. The system of claim 1, wherein the first processor comprises a processor uncertified for use in the safety system, and
   wherein the second processor comprises a safety processor certified for use in the safety system.

3. The system of claim 1, wherein, upon determining that the state is outside the operational envelope, the safety system is configured to switch a mode of operation of the wind turbine to a safe state that shuts down the wind turbine.

4. The system of claim 1, wherein, upon determining that the state is not within the threshold of accuracy, the safety state is configured to switch a mode of operation of the wind turbine to a safe state that shuts down the wind turbine.

5. The system of claim 1, wherein the plurality of parameters are physical or electrical properties of respective components in the wind turbine.

6. The system of claim 1, wherein the operational envelope defines the region in the multi-dimensional space where the wind turbine is deemed to be behaving properly.

7. The system of claim 1, wherein the computing system uses a search algorithm for determining the state of the wind turbine within the multi-dimensional space and the safety system is configured to verify a solution provided by the search algorithm.

8. A method for controlling a wind turbine, the method comprising:
   obtaining sensor data comprising measured values of a plurality of parameters associated with the wind turbine;
   determining, based on the obtained sensor data, a state of the wind turbine within a multi-dimensional space using a computing system comprising at least a first processor that is configured to communicate control signals to one or more components in the wind turbine, wherein each axis in the multi-dimensional space corresponds to a respective one of the plurality of parameters;
   verifying that the state identified by the computing system satisfies a threshold of accuracy using a safety system comprising at least a second processor; and
   upon verifying the state, determining whether the state is within a predefined operational envelope to determine safe operation of the wind turbine, the operational envelope encapsulating a region of the multi-dimensional space.

9. The method of claim 8, wherein the first processor is uncertified for use in the safety system, and wherein the second processor comprises a safety processor certified for use in the safety system.

10. The method of claim 8, further comprising, upon determining the state is outside the operational envelope, switching a mode of operation of the wind turbine to a safe state that shuts down the wind turbine.

11. The method of claim 8, further comprising, upon determining the state does not satisfy the threshold of accuracy, switching a mode of operation of the wind turbine to a safe state that shuts down the wind turbine.

12. The method of claim 8, wherein the plurality of parameters are physical or electrical properties associated with respective components in the wind turbine.

13. The method of claim 8, wherein the operational envelope defines the region in the multi-dimensional space where the wind turbine is deemed to be behaving properly.

14. The method of claim 8, wherein the computing system uses a search algorithm for determining the state of the wind turbine within the multi-dimensional space and the safety system is configured to verify a solution provided by the search algorithm.

15. A wind turbine, comprising:
   a first component;
   a second component;
   a computing system for controlling one or more components in the wind turbine, wherein the computing system comprises at least a first processor that is configured to:
      obtain sensor data comprising measured values of a plurality of parameters associated with the wind turbine,
      determine, based on the obtained sensor data, a state of the wind turbine within a multi-dimensional space, where each axis in the multi-dimensional space corresponds to a respective one of the plurality of parameters, and
      communicate, based at least on the sensor data, a control signal to the first component; and
   a safety system comprising at least a second processor that is configured to:
      verify that the state identified by the computing system satisfies a threshold of accuracy,
      upon verifying the state, determine whether the state is within a predefined operational envelope to determine safe operation of the wind turbine, the operational envelope encapsulating a region of the multi-dimensional space, and
      when the state is outside the predefined operational envelope, communicate a control signal to the second component.

16. The wind turbine of claim 15, wherein the first processor comprises a control processor uncertified for use in the safety system,
   wherein the second processor comprises a safety processor certified for use in the safety system.

17. The wind turbine of claim 15, wherein, upon determining that the state is outside the operational envelope, the safety system is configured to switch a mode of operation of the wind turbine to a safe state that shuts down the wind turbine.

18. The wind turbine of claim 15, wherein, upon determining that the state is not within the threshold of accuracy, the safety state is configured to switch a mode of operation of the wind turbine to a safe state that shuts down the wind turbine.

19. The wind turbine of claim 15, wherein the plurality of parameters are physical or electrical properties associated with respective components in the wind turbine.

20. The wind turbine of claim 15, wherein the operational envelope defines the region in the multi-dimensional space where the wind turbine is deemed to be behaving properly.

* * * * *